(12) United States Patent
Tennison et al.

(10) Patent No.: US 10,006,347 B2
(45) Date of Patent: Jun. 26, 2018

(54) ENGINE SYSTEM AND METHOD FOR CONTROLLING TURBINE OPERATION

(71) Applicant: Ford Global Technologies, LLC, Dearborn, MI (US)

(72) Inventors: Paul Joseph Tennison, West Bloomfield, MI (US); Daniel William Kantrow, Ann Arbor, MI (US); Curtis Michael Bauer, Sr., Temperance, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 14/934,057

(22) Filed: Nov. 5, 2015

(65) Prior Publication Data
US 2017/0130645 A1 May 11, 2017

(51) Int. Cl.
| | | |
|---|---|---|
| F02B 37/18 | (2006.01) |
| F02D 41/00 | (2006.01) |
| F02D 41/02 | (2006.01) |
| F01N 3/20 | (2006.01) |
| F02B 37/02 | (2006.01) |
| F02M 26/43 | (2016.01) |

(52) U.S. Cl.
CPC ............ *F02B 37/18* (2013.01); *F01N 3/2006* (2013.01); *F02B 37/025* (2013.01); *F02D 41/005* (2013.01); *F02D 41/0007* (2013.01); *F02D 41/0082* (2013.01); *F02D 41/024* (2013.01); *F02M 26/43* (2016.02); *F02D 2200/0802* (2013.01); *Y02T 10/144* (2013.01); *Y02T 10/26* (2013.01); *Y02T 10/47* (2013.01)

(58) Field of Classification Search
CPC ...... F02B 37/18; F02B 37/025; F02D 41/024; F02D 41/005; F02D 41/0082; F02D 41/0007; F02D 2200/0802; F01N 3/2006; F02M 26/43; Y02T 10/26; Y02T 10/47; Y02T 10/144
USPC ........................................................ 60/605.2
See application file for complete search history.

(56) References Cited

U.S. PATENT DOCUMENTS

| | | | |
|---|---|---|---|
| 4,356,695 A | 11/1982 | Sumi et al. | |
| 4,389,845 A * | 6/1983 | Koike | ...................... F01D 9/026 415/145 |
| 4,745,753 A * | 5/1988 | Tadokoro | .............. F02B 37/025 60/602 |
| 4,982,567 A * | 1/1991 | Hashimoto | ........... F02B 37/001 60/600 |
| 6,256,993 B1 * | 7/2001 | Halimi | .................. F02B 37/025 60/600 |

(Continued)

FOREIGN PATENT DOCUMENTS

| | | |
|---|---|---|
| EP | 0580664 B1 | 11/1995 |
| WO | 2014140598 A1 | 9/2014 |

*Primary Examiner* — Jason T Newton
(74) *Attorney, Agent, or Firm* — Julia Voutyras; McCoy Russell LLP (57) ABSTRACT

A method for operating an engine system is provided. The method includes during a first condition, flowing exhaust gas from a first exhaust gas conduit to a first turbine inlet of a turbine and flowing exhaust gas from a second exhaust gas conduit to a turbine bypass conduit and during a second condition, flowing exhaust gas from the first exhaust gas conduit to the first turbine inlet and exhaust gas from the second exhaust gas conduit to a second turbine inlet.

16 Claims, 3 Drawing Sheets

(56) References Cited

U.S. PATENT DOCUMENTS

| | | |
|---|---|---|
| 7,360,362 B2 | 4/2008 | Nicolle et al. |
| 7,363,761 B1 * | 4/2008 | Dickerson ............. F02B 37/025 |
| | | 60/602 |
| 7,637,106 B2 * | 12/2009 | Hertweck ............. F02B 37/025 |
| | | 137/625.47 |
| 7,987,837 B2 | 8/2011 | Lupescu et al. |
| 8,056,546 B2 | 11/2011 | Boyer et al. |
| 8,104,281 B2 * | 1/2012 | Wade .................... F02B 37/183 |
| | | 137/630 |
| 8,297,053 B2 | 10/2012 | Gladden et al. |
| 8,464,689 B2 | 6/2013 | Born et al. |
| 8,844,283 B2 | 9/2014 | Kühlmeyer et al. |
| 9,074,521 B2 * | 7/2015 | Russ .................... F02B 37/007 |
| 9,151,218 B2 * | 10/2015 | Ebisu ................... F02B 37/025 |
| 2004/0244373 A1 * | 12/2004 | Frankenstein ........ F02B 37/025 |
| | | 60/602 |
| 2005/0086936 A1 * | 4/2005 | Bucknell ................. F01D 9/026 |
| | | 60/602 |
| 2010/0095671 A1 | 4/2010 | Takagawa et al. |
| 2012/0260897 A1 | 10/2012 | Hayman et al. |
| 2013/0205774 A1 | 8/2013 | Styles et al. |
| 2014/0142833 A1 | 5/2014 | Gingrich et al. |
| 2014/0219849 A1 | 8/2014 | Styles et al. |
| 2015/0308359 A1 * | 10/2015 | Buckland ............. F02B 37/183 |
| | | 60/602 |
| 2016/0108798 A1 * | 4/2016 | VanDerWege ...... F02D 41/0087 |
| | | 60/602 |
| 2016/0208680 A1 * | 7/2016 | McConville .......... F02B 37/183 |

* cited by examiner

FIG. 1

ENGINE SYSTEM AND METHOD FOR CONTROLLING TURBINE OPERATION

FIELD

The present disclosure relates a method for controlling boost operation in an engine system.

BACKGROUND AND SUMMARY

Turbochargers include turbines fed by exhaust gas from an exhaust manifold or in some cases through auxiliary pipes fed from the exhaust manifold to the turbine housing. Wastegates can be utilized to augment the power supplied by turbochargers. Wastegates are routed through the turbine housing to bypass the turbine rotor. The exhaust gas flowing through the turbine housing transfers heat to the turbine housing. As a result, cold start operation may be negatively affected, due to the decreased heating of downstream emission control devices.

In an attempt to resolve this problem, large-mouth wastegates have been developed to increase the mass airflow of the exhaust gas traveling through the wastegate. This reduces heat transfer to the turbine housing. However, by increasing the size of the wastegate a desired amount of airflow through the turbine to provide boost via the turbocharger cannot be achieved while operating the wastegate. Furthermore, when exhaust gas is routed to an exhaust gas recirculation (EGR) system upstream of the wastegate, a sufficient amount of gas flow cannot be routed through the wastegate to achieve fast heating of a downstream catalyst.

To overcome at least some of the aforementioned problems, a method for operating an engine system is provided. The method includes during a first condition, flowing exhaust gas from a first exhaust gas conduit to a first turbine inlet of a turbine and flowing exhaust gas from a second exhaust gas conduit to a turbine bypass conduit and during a second condition, flowing exhaust gas from the first exhaust gas conduit to the first turbine inlet and exhaust gas from the second exhaust gas conduit to a second turbine inlet. In this way, a first stream of exhaust gas can be directed past the turbocharger, to facilitate rapid heating of a downstream emission control device, for example. Moreover, a second stream of exhaust gas fluidly separated from the first stream can be direct into the turbine intake, enabling engine boost to be generated. In this way, engine boost can be achieved while an emission control device downstream of the turbine bypass conduit is rapidly heated. Thus, engine output and efficiency can be increased and engine emissions can be reduced in tandem. In one example, the turbine bypass conduit may be spaced away from the turbine housing to provide increased heat transfer from the exhaust gas to a downstream emission control device. As a result, the emission control device can reach a desired operating temperature even more rapidly, further reducing emissions.

The above advantages and other advantages, and features of the present description will be readily apparent from the following Detailed Description when taken alone or in connection with the accompanying drawings.

It should be understood that the summary above is provided to introduce in simplified forth a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

DETAILED DESCRIPTION

Figure 1:
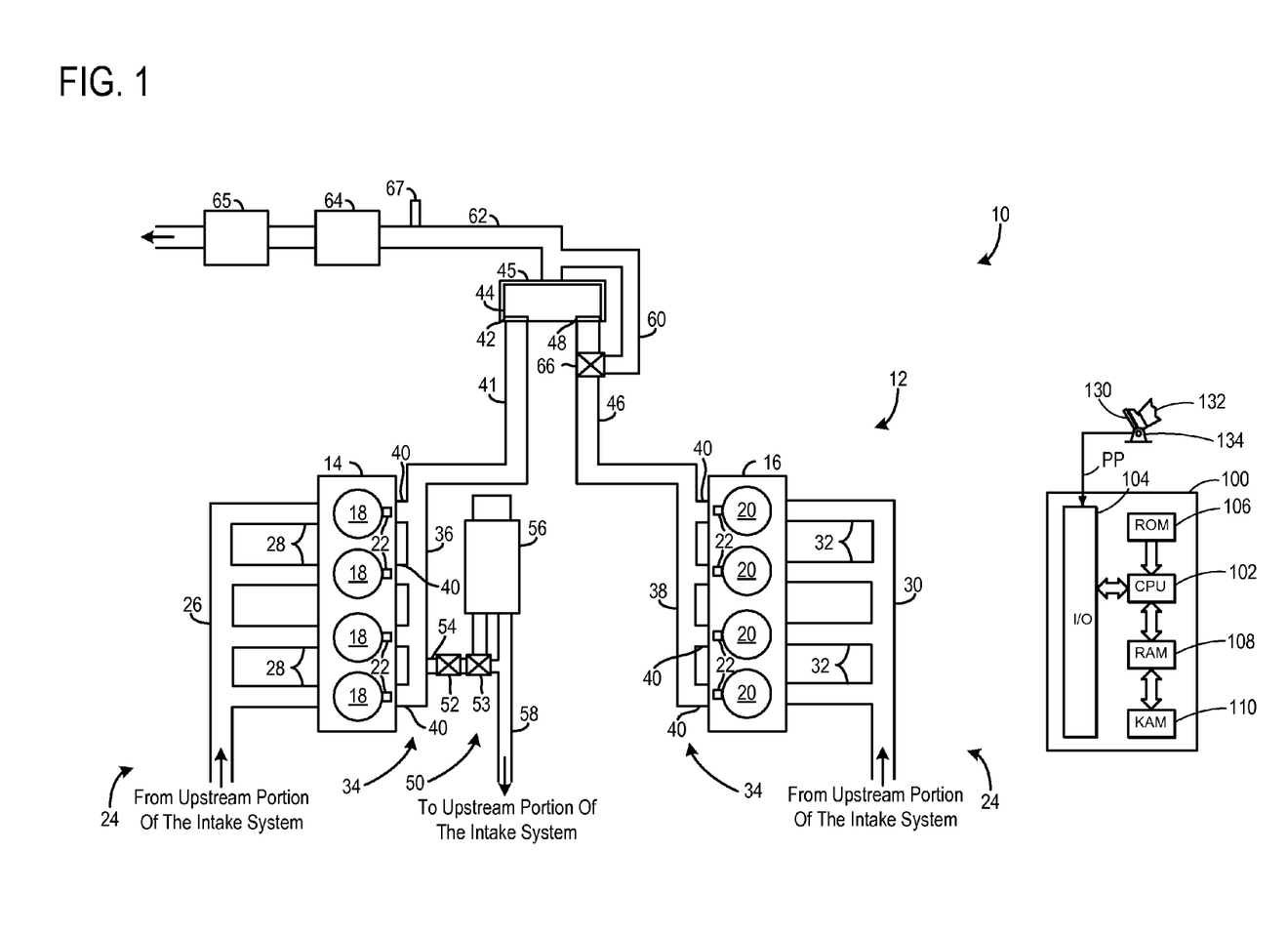
FIG. 1 shows a schematic depiction of an engine system.
Figure 2:
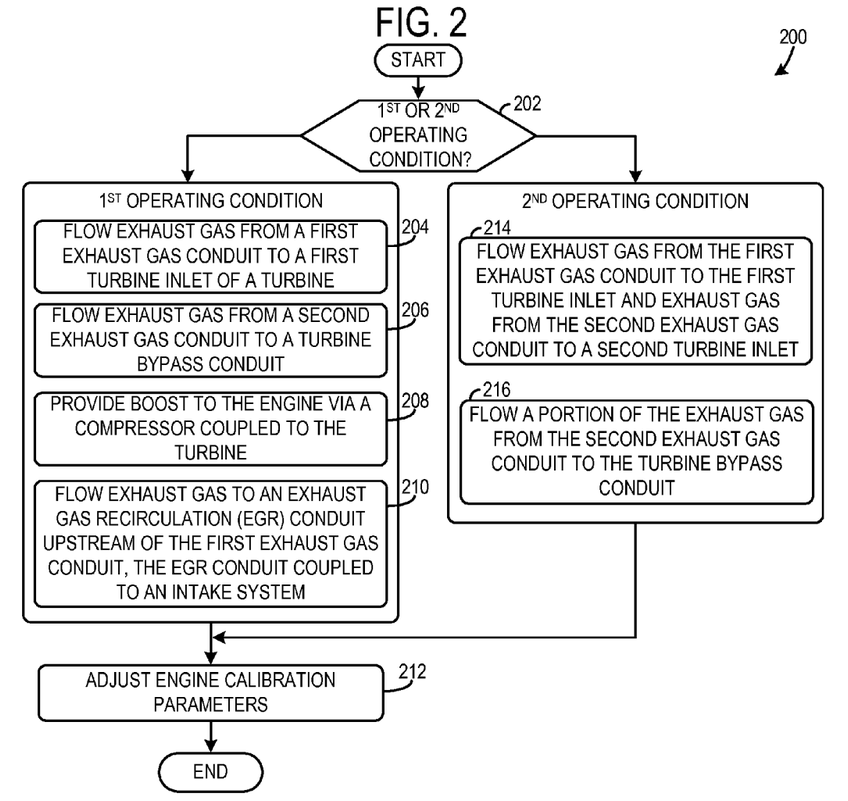
FIG. 2 shows a method for operation of an engine system.
Figure 3:
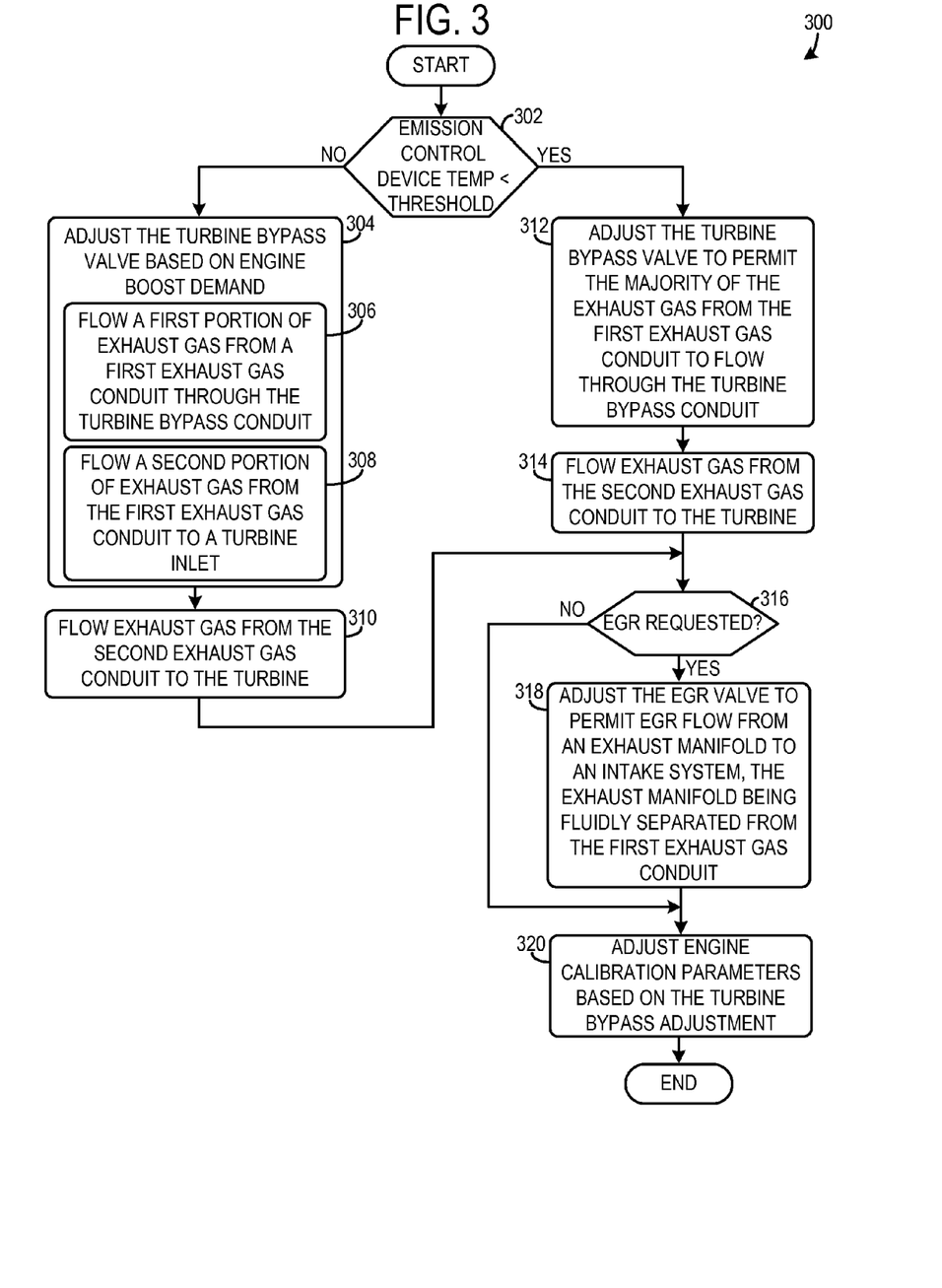
FIG. 3 shows another method for operation of an engine system.

This description relates to systems and methods for cooperatively providing both boost to an engine and rapid emission device heating. This operation can be carried out during a cold start to decrease emissions, for example, or during other engine operating conditions. This cooperative functionality can be achieved through an engine system that includes two fluidly separate exhaust conduits feeding a turbine. The engine system also includes a turbine bypass valve and corresponding bypass conduit coupled to one of the exhaust conduits. The turbine bypass valve can be fully opened to facilitate rapid heating of a downstream emission control device, during a cold start for instance. At the same time exhaust gas can be flowed to the turbine through the other exhaust gas conduit. During another operating condition the turbine bypass valve can provide partial bypass flow to regulate the amount of boost provided to the engine. As a result, the amount of boost provided to the engine can be precisely adjusted when full boost in not needed, during low load operation for instance. Moreover, providing turbine inflow through separate exhaust lines enables a portion of the exhaust gas flow to be direct through an exhaust gas recirculation (EGR) system while another portion of exhaust gas is directed around the turbine for rapid emission control device heating. Consequently, the EGR system and the turbine bypass components can be cooperatively operated to decrease emissions. FIG. 1 shows a schematic depiction of an exemplary engine system providing these features. FIGS. 2 and 3 depict exemplary methods for controlling the engine system to provide the rapid device heating as well as the partial turbine bypass flow operation.

FIG. 1 shows a schematic depiction of an engine system 10. The engine system 10 includes an engine 12. In the depicted example, the engine 12 includes a first cylinder bank 14 and a second cylinder bank 16. However, numerous engine cylinder configurations have been contemplated. The first cylinder bank 14 includes a plurality of cylinders 18. Likewise the second cylinder bank 16 includes a plurality of cylinders 20. The cylinders in each bank may be referred to as a cylinder set.

Each of the cylinders in the first and second cylinder banks 16 and 18 may include various components that facilitate combustion operation, such as fuel injectors 22. The fuel injectors 22 are configured to deliver a metered amount of fuel to the cylinders at selected time intervals. A fuel delivery system including a fuel tank, pumps, fuel conduits, etc., may be provided in the engine system 10 to feed fuel to the fuel injectors 22.

Additionally at least one exhaust and intake valve may be provided for each cylinder. The engine 12 may also include ignition devices coupled to the cylinders 18 and 20, in the case of a spark ignition engine. However in other instances, the engine may be configured to perform compression-ignition.

An intake system 24 is provided to deliver intake air to the cylinders 18 and 20. The intake system 24 includes a first intake manifold 26 and intake runners 28 flowing intake air from the first intake manifold 26 to individual cylinders in the first cylinder bank 14. The intake system 24 also includes a second intake manifold 30 and intake runners 32 flowing intake air from the second intake manifold 30 to individual cylinders in the second cylinder bank 16. Each of the first and second intake manifolds 26 and 30 receive intake air from an upstream portion of the intake system that may include a throttle, air filter, compressor, etc. It will also be appreciated that EGR may be flowed through the intake system 24.

Additionally, an exhaust system 34 is provided to receive exhaust gas from the cylinders 18 and 20. Specifically, the exhaust system 34 includes a first exhaust manifold 36 receiving exhaust gas from the first cylinder bank 14 and a second exhaust manifold 38 receiving exhaust gas from the second cylinder bank 16. Each of the first and second exhaust manifolds 36 and 38 include exhaust runners 40 flowing exhaust gas from individual cylinders to the exhaust manifold.

The exhaust system 34 further includes a first exhaust gas conduit 41 leading from the first exhaust manifold 36 to a first turbine inlet 42 of a turbine 44 and a second exhaust gas conduit 46 leading from the second exhaust manifold 38 to a second turbine inlet 48 of the turbine. In this way, separate exhaust streams can be provided to the turbine 44. These separated exhaust conduits also enable, different portions of exhaust gas to be isolated to drive different exhaust system functions, such as turbine input, emission device heating, and exhaust gas recirculation (EGR) operation. As shown, the first and second exhaust gas conduits 41 and 46 are fluidly separated and are spaced away from one another. However, in other examples, the first and second exhaust gas conduits 41 and 46 may be proximate to one another. The turbine 44 is configured to remove energy from the exhaust gas and convert it into mechanical motion driving a compressor coupled to the turbine via a drive shaft, for example.

An EGR system 50 is also provided in the engine to enable exhaust gas to be reintroduced in the intake system to decrease engine emissions. The EGR system 50 includes an EGR valve 52 providing adjustment of EGR through an EGR conduit 54 coupled to the first exhaust manifold 36. The EGR system 50 further includes an EGR cooler valve 53 enabling adjustment of EGR flow to an EGR cooler 56. Thus, the EGR cooler valve 53 can enable EGR to bypass the EGR cooler during certain periods of operation. The EGR cooler 56 is configured to remove heat from the exhaust gas. It will be appreciated that an EGR conduit 58 positioned downstream of the EGR cooler 56 may be coupled to an intake conduit in the intake system upstream or downstream of a compressor driven by the turbine 44.

A turbine bypass conduit 60 is also provided in the exhaust system 34. The turbine bypass conduit 60 is coupled to the second exhaust gas conduit 46 and to a third exhaust conduit 62 downstream of the turbine 44. As shown, the turbine bypass conduit 60 is spaced away from the turbine 44 and specifically the turbine housing 45. Arranging the turbine bypass conduit 60 and turbine 44 in this manner, enables an increased amount of heat to be transferred to a downstream emission control device 64 (e.g., catalyst, filter, etc.), when compared to wastegate conduits that are routed through the turbine housing. A second emission control device 65 also may be included in the exhaust system 34. The second emission control device 65 may include a particulate filter, such as a diesel particulate filter in the case of a compression ignition engine, a catalyst, etc. Continuing with the example of the compression ignition engine, an additive injector 67 (e.g., urea injector) may be included in the exhaust system 34. The additive injector may be configured to deliver an additive into the exhaust system at desired time intervals to decrease emissions. It will be appreciated that in some examples, the emission system 34 may include additional or alternative emission control devices (e.g., filters, catalysts (e.g., 3-way catalyst, 2-way catalyst), etc.) Moreover, in other examples the emission control devices 64 and 65 may have different relative positions.

A turbine bypass valve 66 is provide to adjust the amount of exhaust flow through the turbine bypass conduit 60 and the amount of exhaust gas directed to the second turbine inlet 48. In one exemplary control scenario, through operation of the turbine bypass valve, the majority (e.g., substantially all) of the exhaust gas flow from the second exhaust gas conduit 46 may be directed through the turbine bypass conduit 60. In this way, the exhaust gas from the second exhaust gas conduit can be directed around the turbine while exhaust gas is fed to the turbine through the first exhaust gas conduit. Consequently, the turbine can be driven to generate boost and exhaust gas can be routed around the turbine to provide emission control device heating, during a cold start, for instance.

In another exemplary control scenario, through operation of the turbine bypass valve, the majority (e.g., substantially all) of the exhaust gas flow from the second exhaust gas conduit 46 may be directed into the turbine 44 via the second turbine inlet 48. This may be carried out during conditions when the engine requires a large amount of boost.

In yet another exemplary control scenario, through operation of the turbine bypass valve, a first portion of the exhaust gas from the second exhaust gas conduit 46 may be flowed to the turbine inlet and a second portion of the exhaust gas from the second exhaust gas conduit 46. In this way, exhaust gas can be simultaneously distributed to the turbine and the turbine bypass conduit through a single valve. This split exhaust gas distribution can take place during conditions when partial boost is desired and/or when the emission control device 64 requires maintenance heating, for example. In this way, the amount of boost provided to the precisely adjusted to achieve improved engine operation, during low load conditions for instance.

Additionally, the turbine bypass valve 66 may be a fast acting valve to reduce delays during transitions between valve operating modes. For example, the turbine bypass valve 66 may be quickly switched to increase boost generation or increase the rate at which the emission control device 64 is heated. Thus, delays in providing boost to the engine during control transitions can be decreased.

A controller 100 may be included in the engine system 10. The controller 100 may be configured to receive signals from sensors in the vehicle as well as send command signals to components such as the turbine bypass valve 66, the EGR valve 52, the EGR cooler valve 53, the fuel injectors 22, the additive injector 67, etc., to adjust operation of the components.

Various components in the engine system 10 may be controlled at least partially by a control system including the controller 100 and by input from a vehicle operator 132 via an input device 130. The control system may also include actuators and/or other component for adjusting injectors, valves, etc., and sensors described herein. In this example, input device 130 includes an accelerator pedal and a pedal position sensor 134 for generating a proportional pedal position signal PP. The controller 100 is shown in FIG. 1 as a microcomputer, including processor 102 (e.g., microprocessor unit), input/output ports 104, an electronic storage medium for executable programs and calibration values shown as read only memory 106 (e.g., read only memory chip) in this particular example, random access memory 108, keep alive memory 110, and a data bus.

Storage medium read-only memory 106 can be programmed with computer readable data representing instructions executable by processor 102 for performing the methods described below as well as other variants that are anticipated but not specifically listed. The turbine bypass valve 66, the EGR valve 52, the additive injector 67, the fuel injectors 22, and the EGR cooler valve 53 may receive signals from the controller to adjust the configurations of the valves during different operating conditions. For instance, during when the emission control device 65 is below a threshold operating temperature, the turbine bypass valve 66 may be fully opened to flow the majority of the exhaust gas from the second exhaust gas conduit 46 through the turbine bypass conduit 60. At an overlapping time interval the EGR valve 52 may also be operated to provide EGR to the intake system 24. In this way, both EGR operation and emission control device heating can be simultaneously provided, for instance, to increase emission reductions. Subsequently after the emission control device 65 reaches a desired temperature, the turbine bypass valve 66 may be operated to flow a portion of exhaust gas to the second turbine inlet 48 and another portion of the exhaust gas through the turbine bypass conduit 60. Thus, the turbine bypass valve 66 can be adjusted to enable partial flow through the turbine bypass conduit 60 to enable varying amount of boost to be provided to the engine. Consequently, engine operation can be improved.

FIG. 2 shows a method 200 for operating an engine system. Method 200 may be implemented via the engine system described above with regard to FIG. 1 or another suitable engine system.

At 202 the method determines if the engine system is operating under a first operating condition or a second operating condition. The first operating condition may be when an emission control device is less than a threshold value, indicating cold start conditions, for instance. However other operating conditions have been contemplated.

If the engine is operating under the first operating condition the method advances to 204. At 204 the method includes flowing exhaust gas from a first exhaust gas conduit to a first turbine inlet of a turbine. In this way, a portion of exhaust gas flow in the exhaust system can be directly routed to the turbine.

Next at 206 the method includes flowing exhaust gas from a second exhaust gas conduit to a turbine bypass conduit. In this way a portion of the exhaust gas in the exhaust system can bypass the turbine. As a result, downstream emission components such as catalysts can be more rapidly heated to reduce emissions.

Next at 208 the method includes providing boost to the engine. In this way, engine efficiency and power output can be increased, even for example during a cold start. At 210 the method includes flowing exhaust gas to an exhaust gas recirculation (EGR) conduit upstream of the first exhaust gas conduit, the EGR conduit coupled to an intake system. As such, both EGR and emission device heating can be jointly implemented, an operation that is not possible when the EGR conduit and the turbine bypass conduit draw exhaust gas from a single exhaust stream.

At 212 the method includes adjusting engine calibration parameters. Specifically, the engine calibration parameters may be adjusted to increase engine efficiency and may also be adjusted based on an amount of exhaust gas flowing through the turbine bypass conduit. For instance, when an amount of exhaust gas flowing through the turbine bypass conduit is increased fuel injection quantity may be increased to compensate for the decrease in boost. Further in one example, adjusting engine calibration parameters can include decreasing (e g, inhibiting) late phase combustion operation where fuel is injected into an engine cylinder during a second time interval subsequent to a first time interval. For instance, an amount of fuel injected into the cylinder during a late phase in the combustion cycle may be decreased. It will be appreciated that late phase combustion increases the amount of heat in the exhaust gas. A large amount of late phase combustion may not be necessary due to the rapid heating of the emission control device achieved by routing exhaust gas through the turbine bypass conduit. Additionally, adjusting engine calibration parameters can include adjusting fuel injection quantity, fuel injection timing, emission additive injection, EGR valve operation, etc. It will be appreciated that in the depicted example step 212 is not implemented during either the $1^{st}$ or $2^{nd}$ operating condition and therefore may be implemented during a $3^{rd}$ operating condition. However, in other examples step 212 may be implemented during both the $1^{st}$ and $2^{nd}$ operating conditions.

However, if the engine system is operating under the second operating condition the method advances to 214. The second operating condition may be when an emission control device is above a threshold value. However, other operating conditions have been contemplated. At 214 the method includes flowing exhaust gas from the first exhaust gas conduit to the first turbine inlet and exhaust gas from the second exhaust gas conduit to a second turbine inlet. In this way, exhaust gas can be provided to both of the inlets of the turbine to provide increased engine boost. Next at 216 the method includes flowing a portion of the exhaust gas from the second exhaust gas conduit to the turbine bypass conduit. In this way, boost operation can be adjusted during the second operating condition based on engine output demands to increase engine output and efficiency. Further in one example, the method may include during the $2^{nd}$ operating condition, inhibiting exhaust gas flow through the turbine bypass conduit. After 216 the method advances to 212.

FIG. 3 shows a method 300 for operating an engine system. Method 300 may be implemented via the engine system described above with regard to FIG. 1 or another suitable engine system.

At 302 the method determines if an emission control device (e.g., catalyst) is less than a threshold temperature (e.g., predetermined threshold temperature). The threshold value may correspond to an operating temperature of the emission control device that can achieve a baseline level of emission reductions. If the emission control device is not below a threshold temperature (NO at 302) the method proceeds to 304. At 304 the method includes adjusting the turbine bypass valve based on engine boost demand. Adjusting the turbine bypass valve may include at 306 flowing a first portion of exhaust gas from a first exhaust gas conduit through the turbine bypass conduit and at 308 flowing a second portion of exhaust gas from the first exhaust gas conduit to a turbine inlet.

At 310 the method includes flowing exhaust gas from the second exhaust gas conduit to the turbine. After 310 the method advances to 316. If it is determined that the emission control device is less than the threshold temperature (YES at 302) the method advances to 312. At 312 the method includes adjusting the turbine bypass valve to permit the majority of the exhaust gas from the first exhaust gas conduit to flow through the turbine bypass conduit. In this way, exhaust gas can be flowed around the turbine to rapidly heat a downstream emission control device. Next at 314 the method includes flowing exhaust gas from the second exhaust gas conduit to the turbine. In this way, the turbine can be driven with exhaust gas while another portion of the exhaust is directed around the turbine for emission control device heating.

At 316 it is determined if EGR is requested. If EGR is not requested (NO at 316) the method advances to 320. At 320 the method includes adjusting engine calibration parameters based on the turbine bypass adjustment. Specifically, the engine calibration parameters may be adjusted to increase engine efficiency. In the way, the modified boost condition can be compensated for to improve engine operation. The engine calibration parameters may be fuel injection rate, fuel injection timing (e.g., late phase fuel injection timing/rate), fuel rail pressure, EGR valve position, emission additive injection rate/timing, etc.). For instance, the rate of late phase fuel injection may be decreased.

However, if EGR is requested (YES at 316) the method proceeds to 318. At 318 the method includes adjusting the EGR valve to permit EGR flow from an exhaust manifold to an intake system, the exhaust manifold being fluidly separated from the first exhaust gas conduit. In this way, exhaust gas can be drawn from another exhaust stream to drive EGR while another portion of the exhaust gas is flowed around the turbine to facilitate rapid emission device heating. After 318 the method advances to 320.

Additionally in other exemplary methods, the turbine bypass valve may be adjusted to implement particulate filter regeneration. For instance, when it is determined that particulate filter regeneration is needed the turbine bypass valve may be opened to increase the temperature of the exhaust gas flowed to a catalyst and the particulate filter. In such an example, late phase combustion may be decreased (e.g., inhibited).

The subject matter of the present disclosure is further described in the following paragraphs. According to one aspect, a method for operating an engine system is provided. The method includes during a first condition, flowing exhaust gas from a first exhaust gas conduit to a first turbine inlet of a turbine and flowing exhaust gas from a second exhaust gas conduit to a turbine bypass conduit; and during a second condition, flowing exhaust gas from the first exhaust gas conduit to the first turbine inlet and exhaust gas from the second exhaust gas conduit to a second turbine inlet.

In this aspect, the method may further include during the second operating condition, flowing a portion of the exhaust gas from the second exhaust gas conduit to the turbine bypass conduit.

In this aspect, the method may further include during the first condition, providing boost to the engine via a compressor coupled to the turbine.

In this aspect, the method may further include during the first condition, flowing exhaust gas to an exhaust gas recirculation (EGR) conduit upstream of the first exhaust gas conduit, the EGR conduit coupled to an intake system.

In this aspect, the first condition may be when a catalyst positioned downstream of the turbine bypass conduit is below a threshold temperature and the second condition may be when the catalyst is above a threshold temperature.

In this aspect, the method may further include during the first condition, decreasing late phase combustion operation where fuel is injected into an engine cylinder during a second time interval subsequent to a first time interval.

In this aspect, the turbine bypass conduit may be spaced away from a turbine housing.

In this aspect, the method may further include during the first operating condition, flowing exhaust gas from the turbine bypass conduit to an emission control device.

In this aspect, the first and second exhaust gas conduits may be spaced away from one another.

According to another aspect, an engine system is provided. The engine system includes a first exhaust gas conduit receiving exhaust gas from an engine; a second exhaust gas conduit separated from the first exhaust gas conduit receiving exhaust gas from the engine; a turbine including a first turbine inlet coupled to the first exhaust gas conduit and a second turbine inlet coupled to the second exhaust gas conduit; a turbine bypass conduit coupled to the second exhaust gas conduit upstream of the second turbine inlet and to an exhaust gas conduit upstream of an emission control device and downstream of a turbine outlet; a turbine bypass valve coupled to the turbine bypass conduit; and a control system configured to, during a first operating condition, operate the turbine bypass valve to permit exhaust gas flow from the second exhaust gas conduit to the turbine bypass conduit and flowing exhaust gas from the first exhaust gas conduit to the first turbine inlet and during a second operating condition, flowing exhaust gas from the first exhaust gas conduit to the first turbine inlet and flowing exhaust gas from the second exhaust gas conduit to the second turbine inlet.

In this aspect, the control system may be further configured to, during the first operating condition, flow exhaust gas to an exhaust gas recirculation (EGR) conduit upstream of the first exhaust gas conduit, the EGR conduit coupled to an intake system.

In this aspect, the engine may include a first cylinder set configured to flow exhaust gas to the first exhaust gas conduit and a second cylinder set configured to flow exhaust gas to the second exhaust gas conduit.

In this aspect, the emission control device may be a catalyst.

In this aspect the engine system may further include a second turbine bypass conduit coupled to the first exhaust gas conduit upstream of the first turbine inlet and to the exhaust gas conduit upstream of the emission control device and downstream of the turbine outlet and a second turbine bypass valve coupled to the second turbine bypass conduit.

In this aspect, the control system may be further configured to, during the first operating condition, decrease late phase combustion operation where fuel is injected into an engine cylinder during a second time interval subsequent to a first time interval.

In this aspect the first operating condition may be when the emission control device is below a threshold temperature and the second operating condition is when the emission control device is above the threshold temperature.

In this aspect, the turbine bypass conduit may be spaced away from a turbine housing.

According to another aspect, a method for operating an engine system is provided. The method includes during a first operating condition, flowing exhaust gas through a first exhaust gas conduit to a first turbine inlet of a turbine, flowing exhaust gas from a second exhaust gas conduit to a turbine bypass conduit, and flowing exhaust gas from the second exhaust gas conduit to a second turbine inlet; and during a second operating condition, flowing exhaust gas from the first exhaust gas conduit to the first turbine inlet, flowing exhaust gas from the second exhaust gas conduit to a second turbine inlet, and inhibiting exhaust gas flow through the turbine bypass conduit.

In this aspect, a first portion of exhaust gas flowed from the second exhaust gas conduit to the turbine bypass conduit and a second portion of exhaust gas flowed from the second exhaust gas conduit to the second turbine inlet may be adjusted based on emission control device temperature and engine boost demand.

In this aspect, the method may further include during the first operating condition, flowing exhaust gas to an exhaust gas recirculation (EGR) conduit upstream of the first exhaust gas conduit, the EGR conduit coupled to an intake system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. As another example, the coolant level monitoring after engine shutdown may be in addition to coolant level monitoring techniques that are carried out and/or based on information during engine running and combusting conditions, such as engine coolant temperature measurements, knock feedback, and/or combinations thereof. In addition, the coolant temperature profile may include sampled coolant temperature at a multitude of sample times determined based on an expected exponential decay of coolant temperature toward ambient temperature. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling boost operation in an engine system, comprising:
during a first condition, flowing exhaust gas from a first exhaust gas conduit to a first turbine inlet of a turbine and flowing exhaust gas from a second exhaust gas conduit to a turbine bypass conduit; and
during a second condition, flowing exhaust gas from the first exhaust gas conduit to the first turbine inlet and exhaust gas from the second exhaust gas conduit to a second turbine inlet, and, during the first condition, flowing exhaust gas to an exhaust gas recirculation (EGR) conduit upstream of the first exhaust gas conduit, the EGR conduit coupled to an intake system.

2. The method of claim 1, further comprising, during the second condition, flowing a portion of the exhaust gas from the second exhaust gas conduit to the turbine bypass conduit.

3. The method of claim 2, further comprising, during the first condition, providing boost to an engine via a compressor coupled to the turbine.

4. The method of claim 1, where the first condition is when a catalyst positioned downstream of the turbine bypass conduit is below a threshold temperature and the second condition is when the catalyst is above the threshold temperature.

5. The method of claim 1, further comprising, during the first condition, decreasing a late phase combustion operation where fuel is injected into an engine cylinder during a second time interval subsequent to a first time interval.

6. The method of claim 1, where the turbine bypass conduit is spaced away from a turbine housing.

7. The method of claim 1, further comprising, during the first condition, flowing exhaust gas from the turbine bypass conduit to an emission control device.

8. The method of claim 1, where the first and the second exhaust gas conduits are spaced away from one another.

9. A method for controlling boost operation in an engine system, comprising:
during a first condition, flowing exhaust gas from a first exhaust gas conduit to a first turbine inlet of a turbine and flowing exhaust gas from a second exhaust gas conduit to a turbine bypass conduit; and
during a second condition, flowing exhaust gas from the first exhaust gas conduit to the first turbine inlet and exhaust gas from the second exhaust gas conduit to a second turbine inlet, and, during the first condition, decreasing a late phase combustion operation where fuel is injected into an engine cylinder during a second time interval subsequent to a first time interval.

10. The method of claim 9, further comprising, during the second condition, flowing a portion of the exhaust gas from the second exhaust gas conduit to the turbine bypass conduit.

11. The method of claim 10, further comprising, during the first condition, providing boost to an engine via a compressor coupled to the turbine.

12. The method of claim 9, further comprising, during the first condition, flowing exhaust gas to an exhaust gas recirculation (EGR) conduit upstream of the first exhaust gas conduit, the EGR conduit coupled to an intake system.

13. The method of claim 9, where the first condition is when a catalyst positioned downstream of the turbine bypass conduit is below a threshold temperature and the second condition is when the catalyst is above the threshold temperature.

14. The method of claim 9, where the turbine bypass conduit is spaced away from a turbine housing.

15. The method of claim 9, further comprising, during the first condition, flowing exhaust gas from the turbine bypass conduit to an emission control device.

16. The method of claim 9, where the first and the second exhaust gas conduits are spaced away from one another.

* * * * *